(12) United States Patent
Chou et al.

(10) Patent No.: US 8,868,067 B2
(45) Date of Patent: Oct. 21, 2014

(54) IDENTIFYING COVERAGE HOLES USING INTER-RAT HANDOVER MEASUREMENTS

(71) Applicant: Intel Corporation, Santa Clara, CA (US)

(72) Inventors: Joey Chou, Scottsdale, AZ (US); Jorge Mena, Moreno Valley, CA (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 13/730,266

(22) Filed: Dec. 28, 2012

(65) Prior Publication Data

US 2014/0031030 A1    Jan. 30, 2014

Related U.S. Application Data

(60) Provisional application No. 61/676,775, filed on Jul. 27, 2012.

(51) Int. Cl.
*H04W 24/04* (2009.01)
*H04B 7/04* (2006.01)

(52) U.S. Cl.
CPC ............ *H04B 7/0417* (2013.01); *H04B 7/0469* (2013.01); *H04W 24/04* (2013.01); *H04B 7/0478* (2013.01)
USPC ............................ 455/423; 370/331; 455/437

(58) Field of Classification Search
CPC ..... H04B 7/0469; H04W 80/04; H04W 1/707
USPC ........... 455/423, 437, 436, 418; 370/331, 335
See application file for complete search history.

(56) References Cited

U.S. PATENT DOCUMENTS 7,113,793 B2    9/2006  Veerasamy et al.

2013/0084842 A1*  4/2013  Laitinen et al. ............... 455/418
2014/0038614 A1*  2/2014  Diachina et al. .............. 455/437

OTHER PUBLICATIONS

3GPP, "3rd Generation Partnership Project; Technical Specification Group Services and System Aspects; Telecommunication management; Study on NM Centralized Coverage and Capacity Optimization (CCO) SON Function (Release 12)," 3GPP TR 32.836, Oct. 31, 2012, LTE Advanced, 14 pages.
International Search Report and Written Opinion mailed Oct. 1, 2013 from International Application No. PCT/US2013/048361.
Chen et al., "A Secure Relay-Assisted Handover Protocol for Proxy Mobile IPv6 in 3GPP LTE Networks," WCNC 2010, IEEE, See abstract; figs. 4, 6.
Ahmed et al., "Probabilistic Coverage in Wireless Sensor Networks," 2005, IEEE, See abstract; second page left col., line 1—right col., line 3.

* cited by examiner

*Primary Examiner* — Phuoc H Doan
(74) *Attorney, Agent, or Firm* — Schwabe, Williamson & Wyatt, P.C.

(57) ABSTRACT

Embodiments of systems and techniques for identifying coverage holes in a radio access technology (RAT) are described. In some embodiments, a network management (NM) apparatus may receive a first report, including one or more measurements taken by a first user equipment (UE), in response to an event related to a handover of the first UE between a first radio access technology (RAT) and a second RAT different from the first RAT. The NM apparatus may receive a second report including one or more measurements taken by a second UE in response to an event related to a handover of the second UE between the first RAT and a third RAT different from the first RAT. The NM apparatus may identify a hole in a coverage area of the first RAT based at least in part on the first and second reports. Other embodiments may be described and claimed.

20 Claims, 6 Drawing Sheets

IDENTIFYING COVERAGE HOLES USING INTER-RAT HANDOVER MEASUREMENTS

CROSS-REFERENCE TO RELATED APPLICATION

This application claims priority to U.S. Provisional Patent Application No. 61/676,775, entitled "Advanced Wireless Communication Systems and Techniques" and filed Jul. 27, 2012, the contents of which are hereby incorporated by reference in their entirety herein.

TECHNICAL FIELD

The present disclosure relates generally to wireless communication, and more particularly, to systems and techniques for identifying coverage holes in a radio access technology (RAT).

BACKGROUND

Some RATs, such as evolved universal terrestrial radio access (E-UTRA) technology, may be deployed in locations with dense populations in an attempt to mitigate traffic congestion during peak hours. Because of the selective use of these RATs in high density locations, any such RAT may have many coverage holes (e.g., in the low density locations between high density locations), particularly in the initial deployment phase of these RATs. Legacy RATs, such as a universal mobile telecommunications system terrestrial radio access (UTRA) technology or a global system for mobile communications enhanced data rates for global system for mobile communication evolution radio access (GERA) technology, may provide coverage to the underlying area (in both high and low density locations). In an area with multiple RATs, user equipment (UE) that utilizes services provided by the RATs may be handed off between RATs (referred to as an inter-RAT handover) in response to, for example, movement of the UE and changes in RAT traffic.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of systems and techniques for identifying coverage holes in a radio access technology (RAT) using inter-RAT handover measurements are described. In some embodiments, a network management (NM) apparatus may receive a first report, including one or more measurements taken by a first user equipment (UE), in response to an event related to a handover of the first UE between a first radio access technology (RAT) and a second RAT different from the first RAT. The NM apparatus may receive a second report including one or more measurements taken by a second UE in response to an event related to a handover of the second UE between the first RAT and a third RAT different from the first RAT. The NM apparatus may identify a hole in a coverage area of the first RAT based at least in part on the first and second reports.

The systems and techniques disclosed herein may enable the detection and characterization of coverage holes that may not be otherwise detected. For example, when a cell of a source RAT such as E-UTRA technology is overlaid by one or more cells of other RATs (e.g., an UTRAN cell or a GERAN cell), a UE approaching a coverage hole in the E-UTRAN may be handed over to one of the other RATs instead of generating a radio link failure (RLF) report. Because no RLF report is received by the E-UTRAN, network management functions may be unaware of the E-UTRAN coverage hole. By transmitting measurement reports when a handover to another RAT occurs, in accordance with some of the embodiments disclosed herein, a source RAT (such as an E-UTRA technology) may identify previously unnoticed coverage holes.

Various embodiments of the systems and techniques described herein may be advantageously used in a number of applications to increase the quality of RAT services. For example, coverage holes identified using inter-RAT handover measurements may be minimized by adjusting one or more service parameters of existing RAT cells (e.g., shape or size). In another example, identified coverage holes may be eliminated or reduced by deploying new base stations (e.g., eNBs, also referred to as enhanced nodeBs and eNodeBs) in coverage-deficient areas. Such embodiments may be included in coverage and capacity optimization (CCO) operations. The present disclosure may be particularly advantageous in self-organizing network (SON) applications, including those in which network optimization is centralized in one or more NM apparatuses or other devices.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" or "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
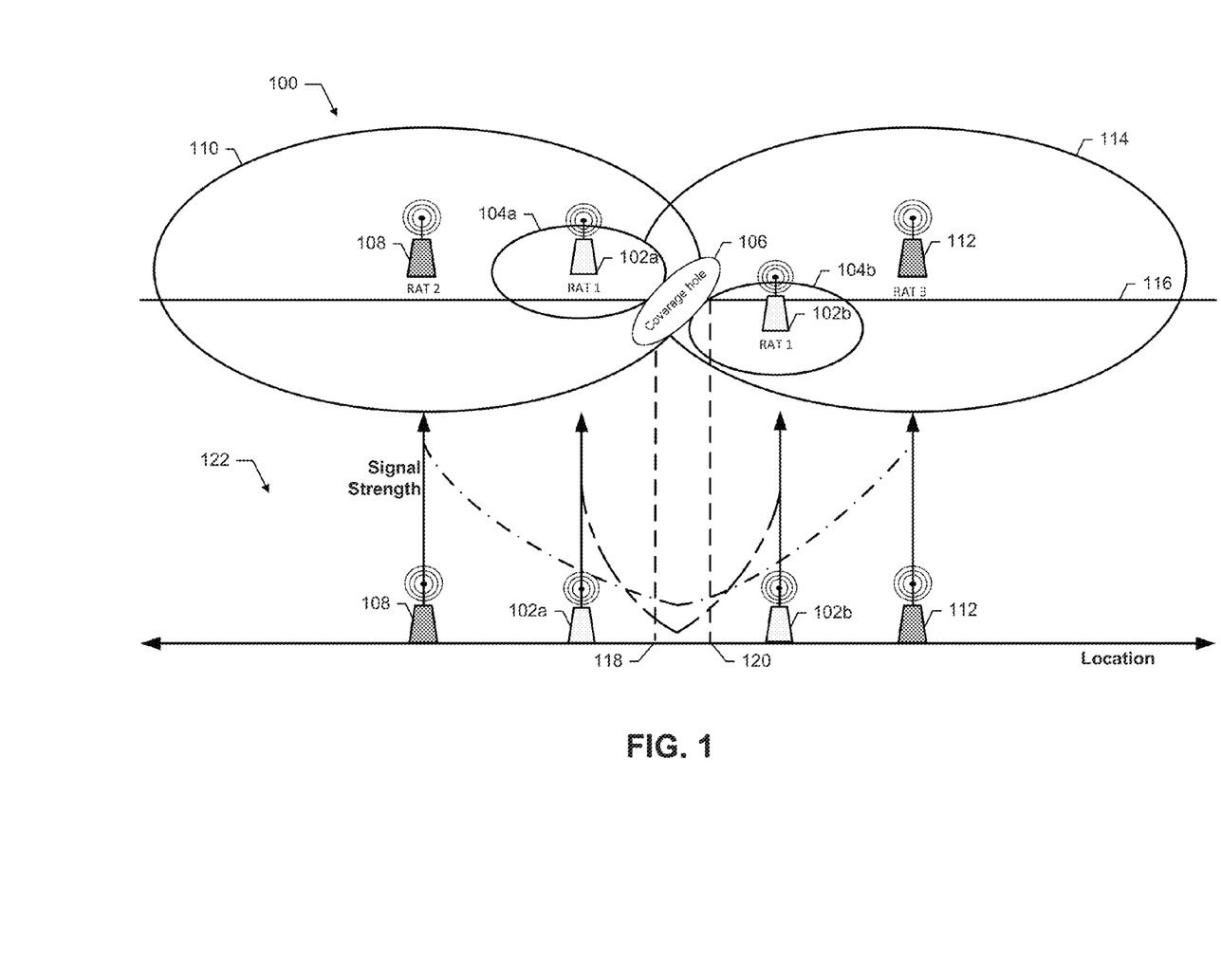
FIG. 1 illustrates an environment in which two inter-RAT handovers occur proximate to a coverage hole in one RAT, in accordance with various embodiments.

Referring now to FIG. 1, an environment 100 is illustrated in which two inter-RAT handovers occur proximate to a coverage hole 106 in a first RAT, in accordance with various embodiments. In FIG. 1, the first RAT (indicated as RAT 1) may be supported by two base stations 102a and 102b. Each base station 102a and 102b may provide service in a respective coverage cell 104a and 104b. In some embodiments, the first RAT may be an E-UTRA technology, and base stations 102a and 102b may be (or may include) eNBs. A second RAT (indicated as RAT 2) may be supported by a base station 108 that provides service in a coverage cell 110. A third RAT (indicated as RAT 3) may be supported by a base station 112 that provides service in a coverage cell 114. In some embodiments, the second and third RATs may be different RATs (e.g., an UTRA technology and a GERA technology). In some embodiments, one or both of the second and third RATs are different RATs than the first RAT. The coverage cells 104a, 104b, 110 and 114 may overlap in any of a number of combinations.

In some embodiments, the first RAT may have a coverage hole, generally indicated as 106, representative of an area of deficient service under the first RAT. Deficient service may include, for example, failure to achieve a desired level of signal strength or failure to successfully provide service to UE devices within a certain number of access attempts (e.g., radio resource control (RRC) connection attempts and/or random access attempts). Coverage hole 106 may be the result of the geographic separation of base stations 102a and 102b, obstructions (such as buildings) between base stations 102a and 102b, or any of a number of other conditions resulting in a gap between coverage cells 104a and 104b. When a UE travels to the right along line 116 from RAT 1 coverage cell 104a, the UE may experience insufficient RAT 1 service as it approaches coverage hole 106. Such a circumstance is represented in signal strength diagram 122, which illustrates that the strength of the RAT 1 signal at location 118 (proximate to coverage hole 106) may be too low to support adequate RAT 1 service. In some embodiments, the UE may be handed over to RAT 2 (supported by base station 108) when the UE is proximate to location 118. This inter-RAT handover may occur when the strength of the RAT 2 signal exceeds a relative or absolute threshold above the strength of the RAT 1 signal, for example.

Similarly, when a UE travels to the left along line 116 from RAT 1 coverage cell 104b, the UE may experience insufficient RAT 1 service as it approaches coverage hole 106. Signal strength diagram 122 illustrates that the strength of the RAT 1 signal at location 120 (proximate to coverage hole 106) may be too low to support adequate RAT 1 service. In some embodiments, the UE may be handed over to RAT 3 (supported by base station 112) when the UE is proximate to location 120. This inter-RAT handover may occur when the strength of the RAT 3 signal exceeds a relative or absolute threshold above the strength of the RAT 1 signal, for example.

In some embodiments, measurements taken in response to events related to inter-RAT handovers (such as the handover from RAT 1 to RAT 2 proximate to location 118 and the handover from RAT 1 to RAT 3 proximate to location 120) may be used to identify coverage holes (such as coverage hole 106). For example, a network management (NM) apparatus may receive multiple reports (e.g., from one or more eNBs) including measurements taken by UEs in response to inter-RAT handover events, and may identify a hole in a coverage area (e.g., the hole's location and size) based at least in part on the reports. Additional embodiments are described herein.

Figure 2:
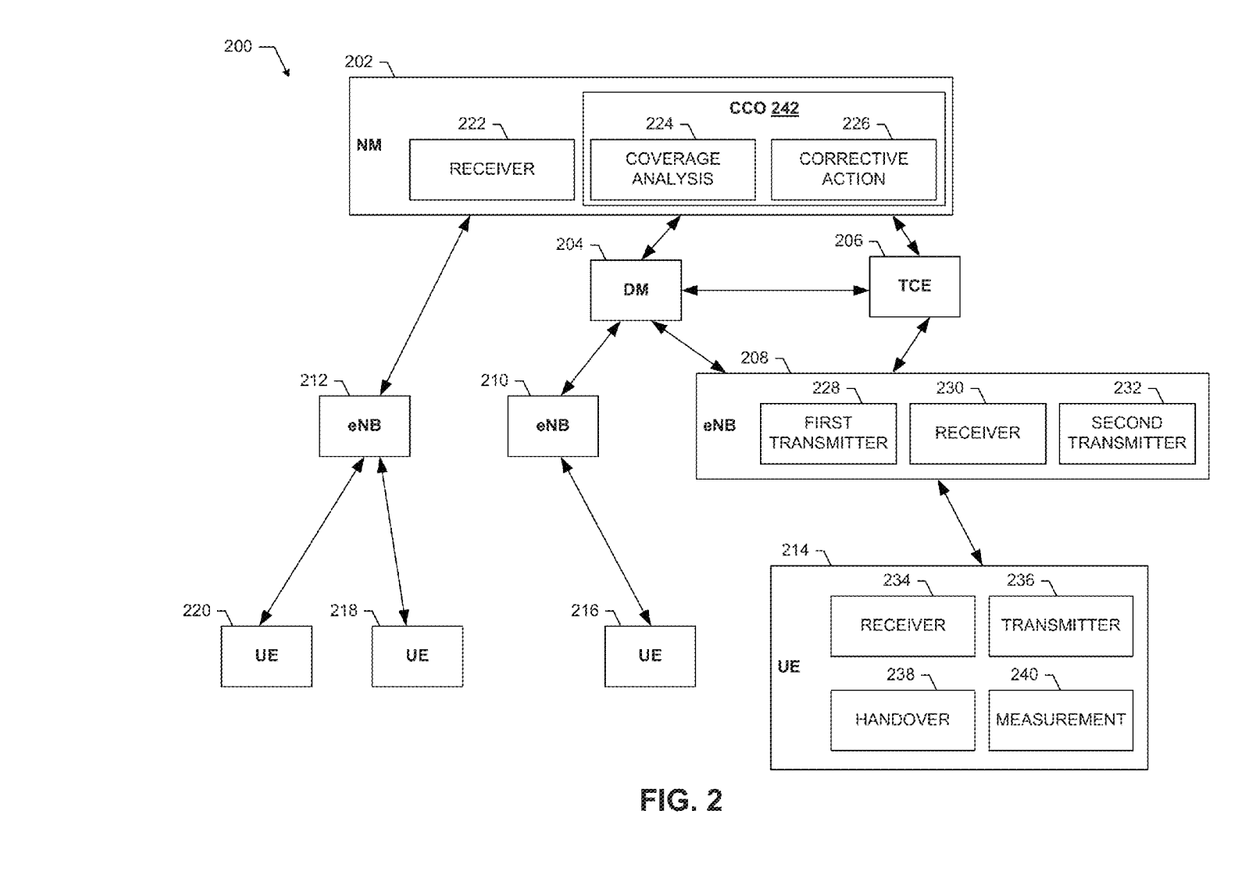
FIG. 2 is a block diagram illustrating an example system for RAT coverage analysis and corrective action, in accordance with various embodiments.

Referring now to FIG. 2, a block diagram of an example system 200 for RAT coverage analysis and corrective action is illustrated, in accordance with various embodiments. System 200 may be configured to support a RAT, such as E-UTRAN. In some embodiments, the RAT supported by system 200 may be the first RAT (RAT 1) of environment 100 of FIG. 1. Examples of components of system 200 may often be discussed with reference to a 3GPP LTE-A RAT, but system 200 may be used to implement other RATs (such as those discussed herein). System 200 may be configured to deliver any of a number of services, such as multimedia delivery over HTTP, live streaming over RTP, conversational services (e.g., video conferencing), and TV broadcasting, for example. System 200 may include other wireless personal area network (WPAN), wireless local area network (WLAN), wireless metropolitan area network (WMAN), and/or wireless wide area network (WWAN) devices such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. While embodiments may be described in the context of LTE-A networks, embodiments may also be employed in other networks (e.g., WiMAX networks).

System 200 may include an NM apparatus 202. In some embodiments, NM apparatus 202 may monitor the components of system 200 and collect measurements of its performance. Based on the analysis of these measurements, NM apparatus 202 may identify potential problems and improvements in the configuration and operation of the components of system 200, and may implement changes to system 200. NM apparatus 202 may include receiver circuitry 222, coverage-analysis circuitry 224 and corrective-action circuitry 226. Receiver circuitry 222 may be configured for receiving signals from other devices by wired or wireless connections. For example, receiver circuitry 222 may be configured to receive signals from or transmit signals to an element manager (EM) component of an eNB (such as any of eNBs 208-212), a domain management (DM) apparatus 204 (which may provide management functions for a domain or other portion of system 200), or any other suitably configured devices. In some embodiments, NM apparatus 202 may communicate with an eNB via a wired connection. In embodiments in which receiver circuitry 222 is configured for wireless communications, it may include, for example, one or more directional or omni-directional antennas (not shown) such as dipole antennas, monopole antennas, patch antennas, loop antennas, microstrip antennas, and/or other types of antennas suitable for reception of radio frequency (RF) or other wireless communication signals.

In some embodiments, receiver circuitry 222 may be configured to receive a first report, including one or more measurements taken by a first UE, in response to an event related to a handover of the first UE between a first RAT and a second RAT different from the first RAT. The event related to the handover may be the issuance of a handover command, the receipt of a handover command, the presence of a handover condition (such as sufficiently favorable signal strength offered to a UE by a different RAT), or any other handover-related event. The RAT supported by system 200 may be the first RAT or the second RAT involved in the handover of the first UE.

The first report may include any of a number of measurements taken by the first UE, such as one or more of a reference signal received power (RSRP), a reference signal received quality (RSRQ), an identifier of a cell that served the first UE in the first RAT, location information (e.g., information about the location of the UE when a handover command is received at the UE), and a time stamp representative of a time of the event related to a handover (e.g., a time stamp of the time of inter-RAT handover).

In some embodiments, receiver circuitry 222 may be configured to receive a second report including one or more measurements taken by a second UE in response to an event related to a handover of the second UE between the first RAT and a third RAT different from the first RAT. For example, system 200 may support an E-UTRA technology. In some such embodiments, the handover of the first UE may occur between a first E-UTRAN cell and the second RAT, and the handover of the second UE may occur between a second E-UTRAN cell and the third RAT. In some embodiments, the second E-UTRAN cell may be different from the first E-UTRAN cell. In some embodiments, each of the second and third RATs is an UTRA technology or a GERA technology. In some embodiments, the first UE and the second UE may be a common UE (e.g., one that undergoes multiple inter-RAT handovers).

In some embodiments, one or more of the first and second reports may be transmitted to NM apparatus 202 by an eNB, such as any of eNBs 208-212. In some such embodiments, an element manager embedded in or associated with the eNB may transmit one or more of the first and second reports to NM apparatus 202. In some embodiments, one or more reports may be transmitted to NM apparatus 202 by a domain management (DM) apparatus 204 in communication with one or more eNBs (such as eNBs 208 and 210, as shown). In some embodiments, one or more reports may be transmitted to NM apparatus 202 by a trace collection entity (TCE) 206 in communication with a DM apparatus (such as DM apparatus 204) and/or one or more eNBs (such as eNB 208, as shown).

As discussed above, NM apparatus 202 may include coverage-analysis circuitry 224 and corrective-action circuitry 226. In some embodiments, coverage-analysis circuitry 224 and corrective-action circuitry 226 may be included in a centralized coverage and capacity optimization (CCO) function 242 of NM apparatus 202. Coverage-analysis circuitry 224 may be configured to identify a hole in a coverage area of the RAT supported by system 200 based at least in part on reports associated with handover events, such as the first and second reports discussed above. For example, in some embodiments, coverage-analysis circuitry 224 may identify a hole in a coverage area of the RAT by correlating multiple reports (e.g., the first and second reports). Correlating multiple reports may include, among other things, associating the multiple reports with a same user-session occurrence or a same geographic area.

Corrective-action circuitry 226 may be configured to recommend a corrective action based on the coverage hole identified by coverage-analysis circuitry 224. In some embodiments, a command to implement the corrective action may be transmitted to one or more components of system 200, such as one or more of eNBs 208-212 or UEs 214-220. In some embodiments, coverage-analysis circuitry 224 and/or corrective-action circuitry 226 may include a display or other output configured to provide coverage information or corrective action recommendations to a human operator, who can then intervene appropriately.

System 200 may include one or more eNBs, such as eNBs 208-212. Each of eNBs 208-212 may include a number of components; for ease of illustration, only the components of eNB 208 are shown in FIG. 2. eNBs other than eNB 208 may have similar components. The components of eNB 208, discussed in detail below, may be included in one or more of base stations 102a, 102b, 108 and 112 of FIG. 1.

As shown, eNB 208 may include first transmitter circuitry 228. First transmitter circuitry 228 may be configured for transmitting wireless signals to other devices. For example, first transmitter circuitry 228 may be configured to transmit wireless signals to UE 214 or other devices suitably configured for wireless communications. First transmitter circuitry 228 may include, for example, one or more directional or omni-directional antennas (not shown), as discussed above. In some embodiments, first transmitter circuitry 228 may be configured to transmit, to a UE in a cell served by the eNB (such as UE 214, as shown), a command to handover the UE to a RAT that is different from the RAT supported by eNB 208 via system 200. For example, the RAT supported by eNB 208 may be E-UTRA technology, and the different RAT may be UTRA technology or GERA technology.

eNB 208 may include receiver circuitry 230. Receiver circuitry 230 may be configured for receiving signals from other devices via wired or wireless connections. For example, receiver circuitry 230 may be configured to receive signals from NM apparatus 202, DM apparatus 204, TCE 206, UE 214 or other devices suitably configured. Receiver circuitry 230, if configured to receive wireless signals, may include, for example, one or more directional or omni-directional antennas (not shown), as discussed above. In some embodiments, receiver circuitry 230 of eNB 208 may be configured to receive, from the UE in response to the handover command, one or more measurements taken by the UE and representative of conditions proximate to an edge of the cell served by eNB 208. In some embodiments, the one or more measurements may be taken by the UE in response to receiving the command at the UE. In some embodiments, the one or more measurements may be taken by the UE prior to receiving the command at the UE.

In some embodiments, first transmitter circuitry 228 (discussed above) may be configured to transmit, to the UE, parameters representative of which measurements are to be taken by the UE as representative of conditions proximate to the edge of the cell. For example, the parameters may be representative of one or more of RSRP, RSRQ, an identifier of the cell, location information, and a time stamp representative of a time of the event related to the handover. In some embodiments, the parameters may be selected by an eNB (such as eNB 208), by a DM apparatus (such as DM apparatus 204), by an NM apparatus (such as NM apparatus 202), by another component of system 200, or by a combination of components.

In some embodiments, first transmitter circuitry 228 may be configured to transmit a trigger signal to a UE trigger the reporting of measurements from the UE. The trigger signal may be included with or separate from parameters representative of which measurements are to be taken by the UE, as discussed above.

eNB 208 may include second transmitter circuitry 232. Second transmitter circuitry 232 may be configured for transmitting signals to other devices via wired or wireless connections. For example, second transmitter circuitry 232 may be configured to transmit signals to NM apparatus 202, DM apparatus 204, TCE 206, or other devices suitably configured. Second transmitter circuitry 228, if configured to transmit wireless signals, may include, for example, one or more directional or omni-directional antennas (not shown), as discussed above. In some embodiments, second transmitter circuitry 232 may be configured to transmit, to a DM apparatus (such as DM apparatus 204) or an NM apparatus (such as NM apparatus 202), a report including the one or more measurements from the UE. The report may be used by the DM apparatus or the NM apparatus to identify coverage holes in the RAT supported by system 200. In some embodiments, the report is transmitted to a CCO function of an NM apparatus.

System 200 may include one or more UEs, such as UEs 214-220. One or more of UEs 214-220 may include any of a number of wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. In some embodiments, one or more of UEs 214-220 may be a mobile wireless device, such as a PDA, cellular telephone, tablet computer or laptop computer. Each of UEs 214-220 may include a number of components; for ease of illustration, only the components of UE 214 are shown in FIG. 2. UEs other than UE 214 may have similar components.

As shown, UE 214 may include receiver circuitry 234. Receiver circuitry 234 may be configured for receiving wireless signals from other devices. For example, receiver circuitry 234 may be configured to receive wireless signals eNB 208 or other devices suitably configured for wireless communications. Receiver circuitry 234 may include, for example, one or more directional or omni-directional antennas (not shown), as discussed above. In some embodiments, receiver circuitry 234 may be configured to receive a command, from an eNB serving the UE (such as eNB 208) to handover UE 214 to a RAT different from the RAT supported by system 200. In some embodiments, the different RAT may be an UTRA technology or a GERA technology, for example. In some embodiments, the RAT supported by system 200 (e.g., an E-UTRA technology) may have a coverage hole proximate UE 214 when the command is received. In some embodiments, receiver circuitry 234 may receive the command to handover UE 214 to a different RAT when UE 214 is proximate to an edge of a cell served by the eNB. In some embodiments, receiver circuitry 234 may receive the command to handover UE 214 to a different RAT when UE 214 is proximate to an edge of an E-UTRAN cell served by the eNB and no other E-UTRAN cell is sufficiently close to the UE to serve the UE.

UE 214 may include transmitter circuitry 236. Transmitter circuitry 236 may be configured for transmitting wireless signals to other devices. For example, transmitter circuitry 236 may be configured to transmit wireless signals to eNB 208 or other devices suitably configured for wireless communications. Transmitter circuitry 236 may include, for example, one or more directional or omni-directional antennas (not shown), as discussed above. In some embodiments, transmitter circuitry 236 may be configured to transmit one or more measurements taken by UE 214 to eNB 208 or another component of system 200. The measurements may be representative of conditions proximate to the coverage hole. In some embodiments, transmitter circuitry 236 may transmit the measurements in response to receiving a handover command. In some embodiments, transmitter circuitry 236 may transmit the one or more measurements upon detection of a trigger signal. The trigger signal may be transmitted from an eNB (such as eNB 208) or some other component of system 200, or may be transmitted and received internal to UE 214. The trigger signal may be associated with a handover command (e.g., indicating receipt of a handover command or successful completion of a handover).

UE 214 may include handover circuitry 238. Handover circuitry 238 may be configured to perform (or assist in the performance of) the handover of UE 214 to the different RAT. For example, handover circuitry 238 may be configured to transition UE 214 to the different RAT without an interruption in service. Handover circuitry 238 may include, for example, signaling circuitry for sending and receiving request, confirmation, error and security information messages in accordance with various handover protocols. In some embodiments, handover circuitry 238 may perform the handover after the one or more measurements are transmitted (e.g., by transmitter circuitry 236) to eNB 208 or another component of system 200.

UE 214 may include measurement circuitry 240. Measurement circuitry 240 may be configured to take the one or more measurements discussed above with reference to transmitter circuitry 236. In particular, in some embodiments, the one or more measurements may include an RSRP, an RSRQ, an identifier of a cell that served the UE in the RAT supported by system 200, location information, and a time stamp representative of a time of an event related to the handover (such as receipt of the handover command).

Figure 3:
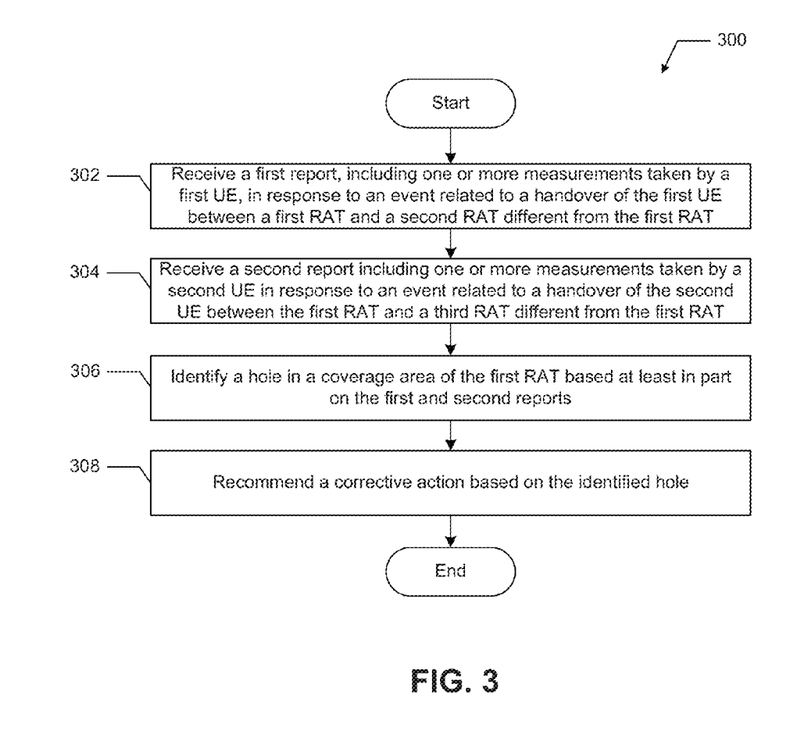
FIG. 3 is a flow diagram of an example inter-RAT handover process executable by a network management (NM) apparatus, in accordance with various embodiments.

Referring now to FIG. 3, a flow diagram of example inter-RAT handover process 300 executable by an NM apparatus (such as NM apparatus 202 of FIG. 2) is illustrated, in accordance with various embodiments. It may be recognized that, while the operations of process 300 (and the other processes described herein) are arranged in a particular order and illustrated once each, in various embodiments, one or more of the operations may be repeated, omitted or performed out of order. For illustrative purposes, operations of process 300 may be described as performed by NM apparatus 202 (FIG. 2), but process 300 may be performed by any suitably configured device.

Process 300 may begin at operation 302, in which NM apparatus 202 may receive a first report, including one or more measurements taken by a first UE (such as UE 214 of FIG. 2), in response to an event related to a handover of the first UE between a first RAT and a second RAT different from the first RAT. In some embodiments, operation 302 may be executed by receiver circuitry 222 (FIG. 2). In some embodiments, the first RAT may be an E-UTRA technology. In some embodiments, the one or more measurements included in the first report may include one or more of an RSRP, an RSRQ, an identifier of a cell that served the first UE in the first RAT, location information, and a time stamp representative of a time of the event related to a handover.

At operation 304, NM apparatus 202 may receive a second report including one or more measurements taken by a second UE in response to an event related to a handover of the second UE between the first RAT and a third RAT different from the first RAT. In some embodiments, operation 304 may be executed by receiver circuitry 222 (FIG. 2). In some embodiments, the first and second UEs may be a common UE. In some embodiments, each of the second and third RATs may be an UTRA technology or a GERA technology. In some embodiments, the handover of the first UE between the first RAT and the second RAT (discussed above with reference to operation 302) may be a handover of the first UE between a first E-UTRAN cell and the second RAT, and the handover of the second UE between the first RAT and the third RAT may be a handover of the second UE between a second E-UTRAN cell and the third RAT. The second E-UTRAN cell may be different from the first E-UTRAN cell.

At operation 306, NM apparatus 202 may identify a hole in a coverage area of the first RAT based at least in part on the first and second reports (received at operations 302 and 304, respectively). In some embodiments, operation 306 may be executed by coverage-analysis circuitry 224 (FIG. 2). In some embodiments, operation 306 may include correlating the first and second reports. At operation 308, NM apparatus 202 may recommend a corrective action based on the identified hole. In some embodiments, operation 308 may be executed by corrective-action circuitry 226 (FIG. 2). Process 300 may then end.

Figure 4:
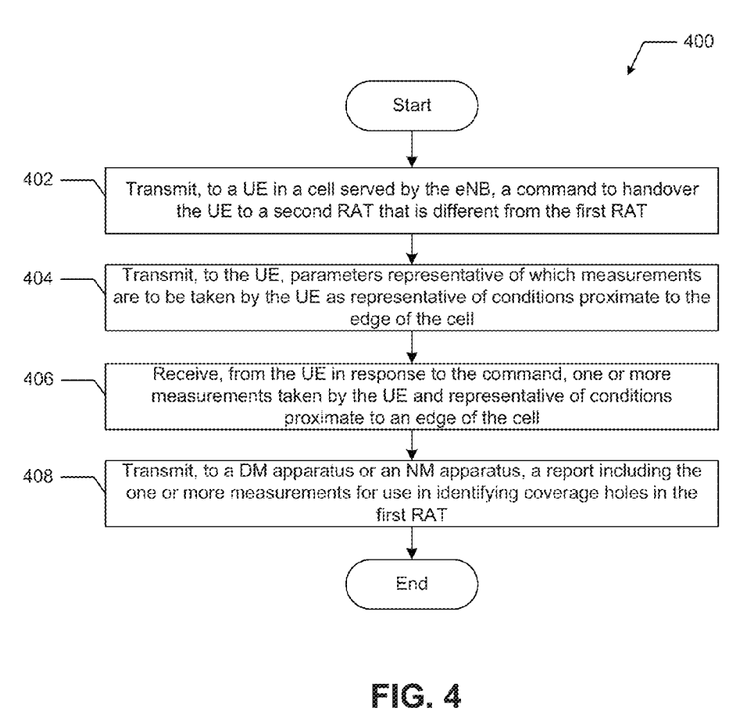
FIG. 4 is a flow diagram of an example inter-RAT handover process executable by an evolved nodeB (eNB), in accordance with various embodiments.

Referring now to FIG. 4, a flow diagram of example inter-RAT handover process 400 executable by an eNB (such as eNB 208 of FIG. 2) is illustrated, in accordance with various embodiments. For illustrative purposes, operations of process 400 may be described as performed by eNB 208 (FIG. 2), but process 400 may be performed by any suitably configured device. eNB 208 will also be described as supporting a first RAT (e.g., E-UTRA technology).

Process 400 may begin at operation 402, in which eNB 208 may transmit, to a UE in a cell served by eNB 208, a command to handover the UE to a second RAT that is different from the first RAT. In some embodiments, operation 402 may be executed by first transmitter circuitry 228 (FIG. 2). In some embodiments, the second RAT is a UTRA technology or a GERA technology.

At operation 404, eNB 208 may transmit, to the UE, parameters representative of which measurements are to be taken by the UE as representative of conditions proximate to the edge of the cell. In some embodiments, operation 404 may be executed by first transmitter circuitry 228 (FIG. 2). The parameters may be representative of an RSRP, an RSRQ, an identifier of the cell, location information, and a time stamp representative of a time of an event related to a handover, for example.

At operation 406, eNB 208 may receive, from the UE in response to the command of operation 204, one or more measurements taken by the UE and representative of conditions proximate to an edge of the cell. In some embodiments, operation 406 may be executed by receiver circuitry 230 (FIG. 2). In some embodiments, the one or more measurements may be taken by the UE in response to receiving the command (of operation 204) at the UE. In some embodiments, the one or more measurements may be taken by the UE prior to receiving the command (of operation 204) at the UE.

At operation 408, eNB 208 may transmit, to a DM apparatus or an NM apparatus, a report including the one or more measurements for use in identifying coverage holes in the first RAT. In some embodiments, operation 408 may be executed by second transmitter circuitry 222 (FIG. 2). In some embodiments, the report transmitted at operation 408 may be transmitted to a CCO function of an NM apparatus.

Figure 5:
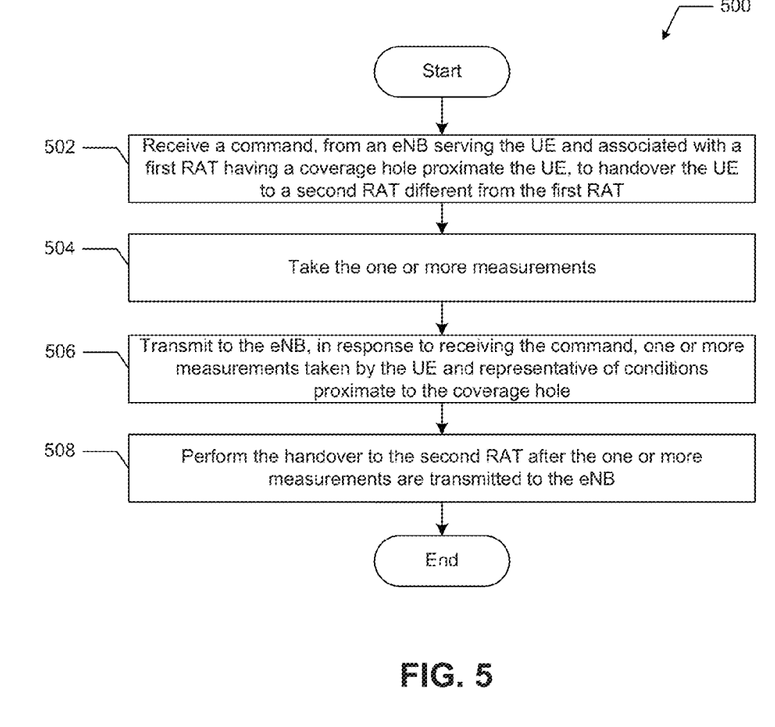
FIG. 5 is a flow diagram of an example inter-RAT handover process executable by a user equipment (UE), in accordance with various embodiments.

Referring now to FIG. 5, a flow diagram of example inter-RAT handover process 500 executable by a UE (such as UE 214 of FIG. 2) is illustrated, in accordance with various embodiments. For illustrative purposes, operations of process 500 may be described as performed by UE 214 (FIG. 2), but process 500 may be performed by any suitably configured device.

Process 500 may begin at operation 502, in which UE 214 may receive a command from an eNB serving UE 214 (e.g., eNB 208 of FIG. 2), the eNB associated with a first RAT having a coverage hole proximate UE 214, to handover UE 214 to a second RAT different from the first RAT. In some embodiments, operation 502 may be executed by receiver circuitry 234 (FIG. 2). In some embodiments, the second RAT may be an UTRA technology or a GERA technology. In some embodiments, receiving a command to handover UE 214 to a second RAT at operation 502 may occur when UE 514 is proximate to an edge of a cell of the first RAT served by the eNB (e.g., eNB 208). For example, in some embodiments, receiving a command to handover UE 214 to a second RAT at operation 502 may occur when UE 2214 is proximate to an edge of an E-UTRAN cell served by the eNB and no other E-UTRAN cell is sufficiently close to UE 214 to serve UE 214.

At operation 504, UE 214 may take one or more measurements representative of conditions proximate to the coverage hole. In some embodiments, the one or more measurements taken at operation 502 may include an RSRP, an RSRQ, an identifier of a cell that served UE 214 in the first RAT, location information, and/or a time stamp representative of a time of an event related to the handover. In some embodiments, operation 502 may be performed by measurement circuitry 240 (FIG. 2).

At operation 506, UE 214 may transmit to the eNB, in response to receiving the command of operation 502, the one or more measurements taken by the UE. In some embodiments, operation 506 may be performed by transmitter circuitry 236 (FIG. 2).

At operation 508, UE 214 may perform the handover to the second RAT (per the command of operation 502). In some embodiments, operation 508 may take place after one or more measurements are transmitted to the eNB. In some embodiments, operation 508 may be performed by handover circuitry 238 (FIG. 2). Process 500 may then end.

In some embodiments, after the inter-RAT handover of operation 508, UE 214 may be configured to log measurements before, during or after an inter-RAT handover, and then transmit these measurements for receipt by NM apparatus 202. Transmission of measurements after inter-RAT handover may occur in addition to transmission of measurements prior to handover (e.g., per operation 506) or instead of transmission of measurements prior to handover. In some embodiments, UE 214 may transmit the measurements, after inter-RAT handover, to a UTRAN or GERAN, which may forward the measurements to NM apparatus 202. In some embodiments, UE 214 may wait to transmit the measurements, after inter-RAT handover, until UE 214 is connected to an E-UTRAN, and may then transmit the measurements to the E-UTRAN.

Figure 6:
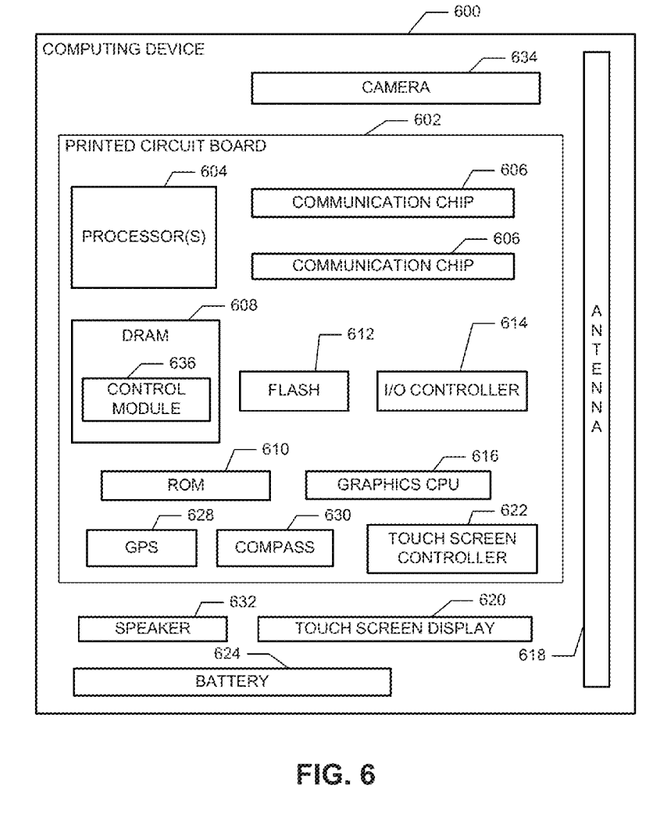
FIG. 6 is a block diagram of an example computing device suitable for practicing the disclosed embodiments, in accordance with various embodiments.

FIG. 6 is a block diagram of example computing device 600, which may be suitable for practicing various disclosed embodiments. For example, some or all of the components of computing device 600 may be used in any of the NM apparatus (such as NM apparatus 202 of FIG. 2), DM apparatus (such as DM apparatus 204 of FIG. 2, TCEs (such as TCE 206 of FIG. 2), eNBs (such as eNBs 102a, 102b, 108 and 112 of FIG. 1 and eNBs 208-212 of FIG. 2), or UEs (such as UEs 214-220 of FIG. 2). Computing device 600 may include a number of components, including one or more processor(s) 604 and at least one communication chip 606. In various embodiments, processor 604 may include a processor core. In various embodiments, at least one communication chip 606 may also be physically and electrically coupled to processor 604. In further implementations, communication chips 606 may be part of processor 604. In various embodiments, computing device 600 may include PCB 602. For these embodiments, processor 604 and communication chip 606 may be disposed thereon. In alternate embodiments, the various components may be coupled without the employment of PCB 602. Communication chip 606 may be included in any of the receiver and/or transmitter circuitry described herein.

Depending on its applications, computing device 600 may include other components that may or may not be physically and electrically coupled to PCB 602. These other components include, but are not limited to, volatile memory (e.g., dynamic random access memory 608, also referred to as DRAM), non-volatile memory (e.g., read-only memory 610, also referred to as "ROM," one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other displays (such as liquid-crystal displays, cathode-ray tube displays and e-ink displays, not shown), battery 624, an audio codec (not shown), a video codec (not shown), global positioning system (GPS) device 628, compass 630, an accelerometer (not shown), a gyroscope (not shown), speaker 632, camera 634, and a mass storage device (such as hard disk drive, a solid state drive, compact disc (CD), digital versatile disc (DVD)) (not shown), and so forth. In various embodiments, processor 604 may be integrated on the same die with other components to form a System on Chip (SoC).

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of the processes described herein. For example, one or more of the memory components such as volatile memory (e.g., DRAM 608), non-volatile memory (e.g., ROM 610), flash memory 612, and the mass storage device may include temporal and/or persistent copies of instructions that, when executed, enable computing device 600 to operate control module 636 configured to practice all or selected aspects of the processes described herein. Memory accessible to computing device 600 may include one or more storage resources that are physically part of a device on which computing device 600 is installed and/or one or more storage resources that is accessible by, but not necessarily a part of, computing device 600. For example, a storage resource may be accessed by computing device 600 over a network via communications chips 606.

Communication chips 606 may enable wired and/or wireless communications for the transfer of data to and from computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems. However, communication chips 606 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. Computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, computing device 600 may be a laptop, a netbook, a notebook, an ultrabook, a smart phone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, computing device 600 may be any other electronic device that processes data.

Computer-readable media (including non-transitory computer-readable media), methods, systems and devices for performing the above-described techniques are illustrative examples of embodiments disclosed herein. Additionally, other devices may be configured to perform various disclosed techniques.

The following paragraphs describe examples of various embodiments. In various embodiments, one or more computer-readable media have instructions that, when executed, cause an NM apparatus to: receive a first report, including one or more measurements taken by a first UE, in response to an event related to a handover of the first UE between a first RAT and a second RAT different from the first RAT; receive a second report including one or more measurements taken by a second UE in response to an event related to a handover of the second UE between the first RAT and a third RAT different from the first RAT; and identify a hole in a coverage area of the first RAT based at least in part on the first and second reports. In some embodiments, the first RAT is an E-UTRA technology. In some embodiments, each of the second and third RATs are an UTRA technology or a GERA technology. In some embodiments, the handover of the first UE between the first RAT and the second RAT is a handover of the first UE between a first E-UTRAN cell and the second RAT, and the handover of the second UE between the first RAT and the third RAT is a handover of the second UE between a second E-UTRAN cell and the third RAT, the second E-UTRAN cell different from the first E-UTRAN cell. In some embodiments, the one or more measurements included in the first report include one or more of RSRP, RSRQ, an identifier of a cell that served the first UE in the first RAT, location information, and a time stamp representative of a time of an event related to a handover. In some embodiments, the first and second UEs are a common UE. In some embodiments, identify a hole in a coverage area of the first RAT based at least in part on the first and second reports includes correlate the first and second reports. In some embodiments, the one or more computer-readable media further have instructions that, when executed, cause the NM apparatus to recommend a corrective action based on the identified hole. Some embodiments of an NM apparatus include combinations of the foregoing.

In various embodiments, an eNB associated with a first RAT includes: first transmitter circuitry to transmit, to a UE in a cell served by the eNB, a command to handover the UE to a second RAT that is different from the first RAT; receiver circuitry to receive, from the UE in response to the command, one or more measurements taken by the UE and representative of conditions proximate to an edge of the cell; and second transmitter circuitry to transmit, to a DM apparatus or an NM apparatus, a report including the one or more measurements for use in identifying coverage holes in the first RAT. In some embodiments, the second RAT includes a UTRA technology or a GERA technology. In some embodiments, the one or more measurements are taken by the UE in response to receiving the command at the UE. In some embodiments, the one or more measurements are taken by the UE prior to receiving the command at the UE. In some embodiments, the first transmitter circuitry is further to transmit, to the UE, parameters representative of which measurements are to be taken by the UE as representative of conditions proximate to the edge of the cell. In some embodiments, the parameters are representative of one or more of RSRP, RSRQ, an identifier of the cell, location information, and a time stamp representative of a time of an event related to a handover. In some embodiments, transmit, to a DM apparatus or an NM apparatus, a report including the one or more measurements includes transmit the report to a CCO function of an NM apparatus. Some embodiments of an eNB include combinations of the foregoing.

In various embodiments, a UE includes: receiver circuitry to receive a command from an eNB serving the UE, the eNB associated with a first RAT having a coverage hole proximate the UE, to handover the UE to a second RAT different from the first RAT; transmitter circuitry to transmit to the eNB, in response to receiving the command, one or more measurements taken by the UE and representative of conditions proximate to the coverage hole; and handover circuitry to perform the handover to the second RAT after the one or more measurements are transmitted to the eNB. In some embodiments, the second RAT is a UTRA technology or a GERA technology. In some embodiments, receive a command to handover the UE to a second RAT occurs when the UE is proximate to an edge of a cell of the first RAT served by the eNB. In some embodiments, receive a command to handover the UE to a second RAT occurs when the UE is proximate to an edge of an E-UTRAN cell served by the eNB and no other E-UTRAN cell is sufficiently close to the UE to serve the UE. In some embodiments, the UE further includes measurement circuitry to take the one or more measurements, the one or more measurements including one or more measurements of the group of measurements consisting RSRP, RSRQ, an identifier of a cell that served the UE in the first RAT, location information, and a time stamp representative of a time of an event related to a handover. Some embodiments of a UE include combinations of the foregoing.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more computer-readable media having instructions that, when executed, cause a network management (NM) apparatus to:
    receive a first report, including one or more measurements taken by a first user equipment (UE), in response to an event related to a handover of the first UE between a first radio access technology (RAT) and a second RAT different from the first RAT;
    receive a second report including one or more measurements taken by a second UE in response to an event related to a handover of the second UE between the first RAT and a third RAT different from the first RAT; and
    identify a hole in a coverage area of the first RAT based at least in part on the first and second reports.

2. The one or more computer-readable media of claim 1, wherein the first RAT is an evolved universal terrestrial radio access (E-UTRA) technology.

3. The one or more computer-readable media of claim 1, wherein each of the second and third RATs are a universal mobile telecommunications system terrestrial radio access (UTRA) technology or a global system for mobile communications enhanced data rates for global system for mobile communication evolution radio access (GERA) technology.

4. The one or more computer-readable media of claim 1, wherein the handover of the first UE between the first RAT and the second RAT is a handover of the first UE between a first evolved universal terrestrial radio access network (E-UTRAN) cell and the second RAT, and the handover of the second UE between the first RAT and the third RAT is a handover of the second UE between a second E-UTRAN cell and the third RAT, the second E-UTRAN cell different from the first E-UTRAN cell.

5. The one or more computer-readable media of claim 1, wherein the one or more measurements included in the first report comprise one or more of reference signal received power (RSRP), reference signal received quality (RSRQ), an identifier of a cell that served the first UE in the first RAT, location information, and a time stamp representative of a time of an event related to a handover.

6. The one or more computer-readable media of claim 1, wherein the first and second UEs are a common UE.

7. The one or more computer-readable media of claim 1, wherein identify a hole in a coverage area of the first RAT based at least in part on the first and second reports comprises correlate the first and second reports.

8. The one or more computer-readable media of claim 1, further having instructions that, when executed, cause the NM apparatus to:
    recommend a corrective action based on the identified hole.

9. An evolved nodeB (eNB) associated with a first radio access technology (RAT), the eNB comprising:
- first transmitter circuitry to transmit, to a user equipment (UE) in a cell served by the eNB, a command to handover the UE to a second RAT that is different from the first RAT;
- receiver circuitry to receive, from the UE in response to the command, one or more measurements taken by the UE and representative of conditions proximate to an edge of the cell; and
- second transmitter circuitry to transmit, to a domain management (DM) apparatus or a network management (NM) apparatus, a report including the one or more measurements for use in identifying coverage holes in the first RAT.

10. The eNB of claim 9, wherein the second RAT comprises a universal mobile telecommunications system terrestrial radio access (UTRA) technology or a global system for mobile communications enhanced data rates for global system for mobile communications evolution radio access (GERA) technology.

11. The eNB of claim 9, wherein the one or more measurements are taken by the UE in response to receiving the command at the UE.

12. The eNB of claim 9, wherein the one or more measurements are taken by the UE prior to receiving the command at the UE.

13. The eNB of claim 9, wherein the first transmitter circuitry is further to:
- transmit, to the UE, parameters representative of which measurements are to be taken by the UE as representative of conditions proximate to the edge of the cell.

14. The eNB of claim 13, wherein the parameters are representative of one or more of reference signal received power (RSRP), reference signal received quality (RSRQ), an identifier of the cell, location information, and a time stamp representative of a time of an event related to a handover.

15. The eNB of claim 9, wherein transmit, to a DM apparatus or an NM apparatus, a report including the one or more measurements comprises transmit the report to a centralized coverage and capacity optimization (CCO) function of an NM apparatus.

16. A user equipment (UE) comprising:
- receiver circuitry to receive a command from an evolved nodeB (eNB) serving the UE, the eNB associated with a first radio access technology (RAT) having a coverage hole proximate the UE, to handover the UE to a second RAT different from the first RAT;
- transmitter circuitry to transmit to the eNB, in response to receiving the command, one or more measurements taken by the UE and representative of conditions proximate to the coverage hole; and
- handover circuitry to perform the handover to the second RAT after the one or more measurements are transmitted to the eNB.

17. The UE of claim 16, wherein the second RAT is a universal mobile telecommunications system terrestrial radio access (UTRA) technology or a global system for mobile communications enhanced data rates for global system for mobile communication evolution radio access (GERA) technology.

18. The UE of claim 16, wherein receive a command to handover the UE to a second RAT occurs when the UE is proximate to an edge of a cell of the first RAT served by the eNB.

19. The UE of claim 18, wherein receive a command to handover the UE to a second RAT occurs when the UE is proximate to an edge of an E-UTRAN cell served by the eNB and no other E-UTRAN cell is sufficiently close to the UE to serve the UE.

20. The UE of claim 16, further comprising:
- measurement circuitry to take the one or more measurements, the one or more measurements comprising one or more measurements of the group of measurements consisting of reference signal received power (RSRP), reference signal received quality (RSRQ), an identifier of a cell that served the UE in the first RAT, location information, and a time stamp representative of a time of an event related to a handover.

* * * * *